United States Patent [19]

Inoue

[11] Patent Number: 4,481,095
[45] Date of Patent: Nov. 6, 1984

[54] APPARATUS FOR SUPPLYING A WORKING FLUID AND A WIRE ELECTRODE TO A WORK PORTION OF A WIRE-CUT ELECTRICAL DISCHARGE MACHINE

[75] Inventor: Kiyoshi Inoue, Tokyo, Japan

[73] Assignee: Inoue-Japax Research Incorporated, Yokohama, Japan

[21] Appl. No.: 463,136

[22] Filed: Feb. 2, 1983

[30] Foreign Application Priority Data

Feb. 3, 1982 [JP] Japan .............................. 57-14497[U]
Nov. 30, 1982 [JP] Japan ................................ 57-209548

[51] Int. Cl.³ .......................... C25F 7/00; B23K 9/28; B23K 9/30
[52] U.S. Cl. ............................... 204/224 M; 204/206; 204/222; 219/69 W; 219/69 V
[58] Field of Search ...................... 204/129.7, 206, 222, 204/224 M, 225; 219/69 W, 69 V

[56] References Cited

U.S. PATENT DOCUMENTS 3,928,163 12/1975 Ullmann et al. ..................... 204/206
4,379,959 4/1983 Inoue ................................. 219/69 M
4,392,042 7/1983 Inoue ............................... 219/69 W
4,417,118 11/1983 Miyano ............................. 219/69 W

FOREIGN PATENT DOCUMENTS 50-95894 7/1975 Japan .
54-135795 9/1979 Japan .
55-157430 12/1980 Japan .
56-9130 1/1981 Japan .............................. 219/69 W
56-76338 6/1981 Japan .............................. 219/69 W
210970 6/1977 U.S.S.R. .......................... 219/69 W Primary Examiner—Howard S. Williams
Assistant Examiner—T. L. Williams
Attorney, Agent, or Firm—Posnack, Roberts, Cohen & Spiecens

[57] ABSTRACT

Apparatus for supplying a working fluid and a wire electrode to a wire region of a wire-cut electrical discharge machine comprising a housing supported by a support member and having opposed aligned openings through which a wire electrode is passed into operation association with a workpiece at the work region to be operated on by the electrode. A working fluid is supplied under pressure into the housing and the working fluid passes through a nozzle supported in the housing against the workpiece. The nozzle is positioned in the housing to surround the wire electrode which travels therethrough and it projects from the housing to discharge the working fluid against the workpiece at a gap formed therewith. A guide die is supported in the housing to guide the wire electrode through the housing and the nozzle. Electrical energy is supplied to the wire electrode before it enters the housing and a second nozzle is supported by the housing to discharge working fluid against the electrical supply system to cool the same.

26 Claims, 11 Drawing Figures

APPARATUS FOR SUPPLYING A WORKING FLUID AND A WIRE ELECTRODE TO A WORK PORTION OF A WIRE-CUT ELECTRICAL DISCHARGE MACHINE

BACKGROUND OF THE INVENTION

1. Field of the Invention

The present invention relates to an apparatus for supplying a working fluid and a wire electrode to a portion to be worked (hereinafter, referred to as a work portion) of a wire-cut electrical discharge working machine, and more particularly to an apparatus for supplying a working fluid in the working gap by using a working fluid nozzle which can produce a tubular working fluid jet which flows so as to surround the thin wire electrode along its substantial length, the working fluid nozzle being movably and coaxially supported with the wire electrode.

2. Description of the Prior Art

Such a technology as mentioned above, namely, that the working fluid is supplied in the working gap by using the working fluid nozzle which can produce the tubular working fluid jet which flows so as to surround the wire electrode, which nozzle is fixed in the housing member, is disclosed, for example, in Japanese Patent Disclosure No. 157,430 of 1980 and U.S. Pat. No. 3,928,163, so it is well-known. Furthermore, such a technology that a part of the working fluid nozzle of this type or the edge thereof can move in the direction of the jet of the working fluid is also disclosed in a Japanese Utility Model Disclosure No. 135,795 of 1979 filed by the same applicant of the present invention.

The present invention contemplates improvements in said movable or controllable working fluid nozzle described above.

SUMMARY OF THE INVENTION

The apparatus of the present invention comprises wire electrode supplying means, a holding apparatus and a cooling apparatus of the power supplying section, all of which have been improved for maintaining a better working state (i.e., optimum spark erosion state), and an apparatus which can restrict the working nozzle and control its location, and a number of other improved features.

According to the present invention, the apparatus for supplying a working fluid or a dielectric fluid and a wire electrode to a work portion of a wire-cut electrical discharge machine essentially comprises:

(a) a housing member fixed to an upper support member or a lower support member of the electrical discharge machine or supported thereto through elevating means which moves said housing member in the direction of the axis of the wire electrode, said housing member having first and second openings which open to the support member side supporting it and to the opposite side thereof and a connecting portion of a working fluid supplying tube, wherein a wire electrode is provided so as to pass through both of said openings and then through the inside of said housing member, and said wire electrode being adapted to move along the passageway formed between said upper and lower support members in order to work a workpiece;

(b) a working fluid supplying tube connected to said connecting portion of the working fluid supplying tube of said housing member;

(c) a working fluid nozzle supported slidably by said housing member and formed therein so that the wire electrode passes through the inside thereof, said nozzle being supported so that one end thereof always projects outside from said second opening on the workpiece side opposite to the support member which supports said housing member itself;

(d) a guide die formed in the flow of the working fluid in said working fluid nozzle or said housing member, said guide die being adapted to receive and pass the wire electrode through its central hole;

(e) means for supplying electric power to said wire electrode, said means being disposed near the first opening on the support member side of said housing member; and (f) a cooling fluid nozzle or an opening having a small bore disposed at said first opening on the support member side of said housing member so that the wire electrode passes through the inside thereof, such that said cooling fluid nozzle is able to produce a jet which reaches said electric power supplying means along the wire electrode.

In one embodiment of the invention, the guide die is supported in the housing member so as to freely rise and fall, and in a particular case, it is supported through an ultrasonic wave oscillator for applying ultrasonic vibration thereto.

In addition, the working fluid nozzle is located at a proper position for the workpiece with the aid of the pressure of the working fluid and of gravity during the working operation; however, in another embodiment of the invention, elastic action from a spring is also added; in another embodiment, an apparatus for engaging the working fluid nozzle at any time is provided to hold the nozzle at a pre-determined position which is different from the automatic balanced location due to the aforementioned forces, and its location is further forcibly controlled to maintain a better working state.

It is recommended that the apparatus according to the present invention be mounted on both upper and lower support members of the workpiece; however, it is attached to the lower support member when it is attached to only one of them.

Moreover, in the case where the apparatus is mounted on both support members, the fluid pressure to be supplied from the apparatus on the lower support member side should be higher than that on the upper support member side; in another case where both apparatuses on the upper and lower support member sides are operated alternately, the operating time of the lower apparatus should be longer than that of the upper one.

OBJECTS

It is therefore an object of the present invention to provide an apparatus for supplying a working fluid and a wire electrode to a work portion of a wire-cut electrical discharge machine, in which, upon working the workpiece by using the wire-cut discharge machine, a quantity of working fluid is supplied in the working gap between the workpiece and the wire electrode and a cooling fluid is fed to the wire electrode power feeder, and in which to cool the wire electrode between a pair of power feeders on both sides of the workpiece to be heated by the working current and the guide die of the wire electrode which will generate a great amount of frictional heat, the guide die is disposed in the working fluid flow, thereby always maintaining a better working state, preventing accidents such as a short-circuit and the like, and attaining the highest work efficiency.

Another object of the invention is to provide a wire-cut electrical discharge machine which can perform the spark erosion at the highest working speed which can be expected and which can finish the working operation in an initial prescribed time by such methods that: the working fluid nozzle is set to the location where the working fluid pressure, the gravity, the elastic power of the spring, etc. are automatically balanced in accordance with the various different working conditions and purposes or the like; the location of the working fluid nozzle is fixed to the predetermined restricted location in place of the automatic balanced location stated above; or that location is servo-controlled so that the designated working state is maintained.

Another object of the invention is to attain the above-mentioned objects by the simplest construction.

These and other objects, features and advantages of the present invention will be apparent from the following description of preferred embodiments, taken in conjunction with the accompanying drawings.

BRIEF DESCRIPTION OF THE DRAWINGS

FIGS. 4 and 4a are cross sections illustrating the mechanical elements of embodiments of the apparatus of the present invention, in which the location of the working fluid nozzle is controlled;

In these drawings, the following apparatuses, parts, elements, circuits and the like are omitted or simplified for the purpose of simplicity of the drawings since those components are well known to those skilled in the art and they are not directly concerned in the essence of the wire-cut electrical discharge machine of the present invention: i.e., a bed; a column; an elevating apparatus of a support member a bench and a cross table for supporting the workpiece; a reel on which the wire electrode has been wound; a capstan and a pinch roller for pulling out the wire electrode from the reel; a brake device for applying tension to the wire electrode; a winding reel of the wire electrode or a collecting vessel; a power source circuit for applying the voltage pulses between the workpiece and the wire electrode; and a working fluid supplying apparatus, etc.

DETAILED DESCRIPTION OF THE PREFERRED EMBODIMENTS

Figure 1:
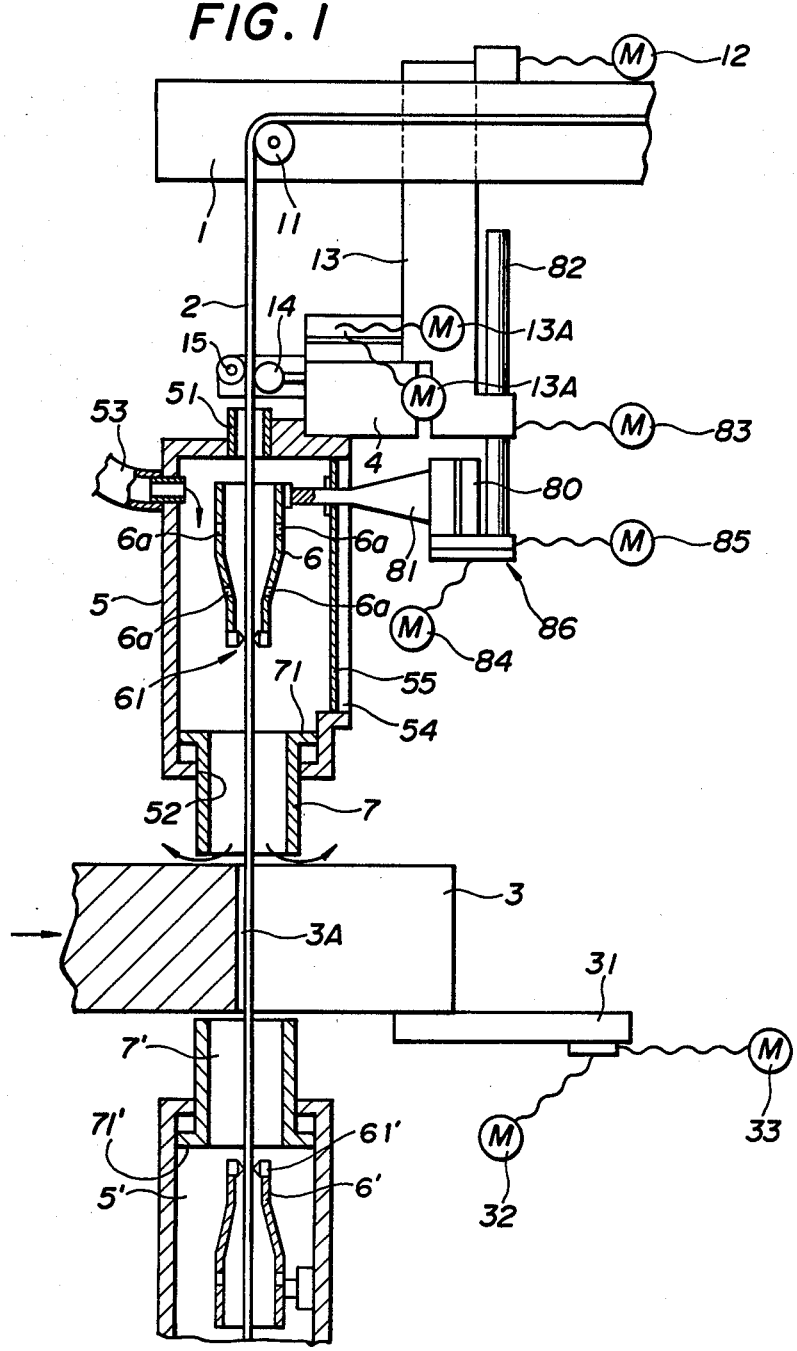
FIG. 1 is a cross section showing an embodiment of the apparatus for supplying a working fluid and a wire electrode to a work portion of the wire-cut electrical discharge machine having a working fluid nozzle of the automatic balancing type according to the present invention.
Figure 2:
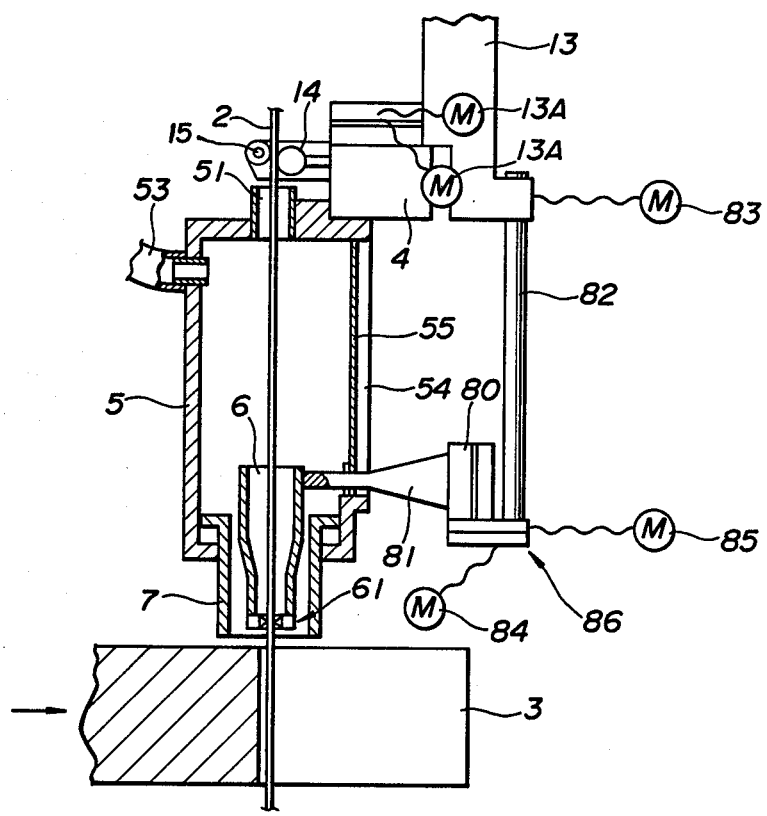
FIG. 2 is a cross section showing the state in which the guide die of the wire electrode of the apparatus shown in FIG. 1 has descended.

Referring to FIG. 1, reference numeral 1 indicates an upper support member; 2 a wire electrode; 3 a workpiece supported by a work table 31 which can be moved in two directions (i.e. along the x and y axes) in a horizontal place by motors 32 and 33 supported so as to move horizontally; 4 a small moving table which can be moved by motors 13A and 13A supported so as to move horizontally; 5 and 5' are cylindrical housing members, member 5 having an opening 51 on the support member side, an opening 52 on the workpiece side, a working fluid supplying hose 53, a longitudinally long slit 54, and a sealing member 55; 6 is a guide die holder for supporting a guide die 61; 7 and 7' are cylindrical working fluid nozzles having flanges 71 and 71' respectively; 11 is a guide roller; 12 a motor for elevating a supporting member 13; 14 an energizing pin; 15 a pinch roller; 80 a magnetostrictive or electrostrictive vibrator; 81 a resonant horn; 82 a shaft for elevating the guide die holder 6; 83 a motor for elevating the shaft 82; 84 and 85 are motors for moving a small moving table 86 supported so as to move horizontally. (the words "elevate", "elevating", "elevation", or "elevationally" used in this specification include all motions along the axis of the wire electrode);

In FIGS. 1 and 2, only the components which are located above the workpiece 3 are mainly illustrated for simplicity of explanation; however, the components which are almost symmetrical or corresponding to them are also equipped in the lower portion of the workpiece 3 as necessary. In this case, the lower energizing pin and the guide die, etc. may be fixed, and ultrasonic vibrating means may be omitted since it is not essential.

The wire electrode 2 is pulled out from a supplying reel (not shown), passes through the inside or at the front of the support member 1, extends downward through a brake roller (not shown) and over the guide roller 11, passes through a lower guide roller (not shown) disposed at the position corresponding to the guide roller 11 in a lower support member (not shown), through a capstan and a pinch roller (not shown), then it is received by a winding reel or a collecting vessel.

The supporting member 13 is attached almost perpendicularly to the support member 1 so that it can be freely elevated by a manual handle (not shown) or the motor 12, and it can be locked at a desired location.

The small moving table 4 is attached under the supporting member 13 so that it can be moved manually or by the motors 13A, 13A in the plane perpendicular to the moving direction of the supporting member 13 and the location thereof can be determined. A power feeding apparatus consisting of the energizing pin 14 and pinch roller 15, both of which are made of super hard alloy, is attached to the left side end surface of the small moving table 4 in the drawing in order to apply the voltage pulses to the wire electrode 2 by abutting thereagainst.

The hollow cylindrical housing member 5 is mounted at the lower surface of this small moving table 4 so that the holder 5 projects downwardly at the left side in the drawing.

The opening 51 at the support member side and the opening 52 at the workpiece side are formed coaxially with the cylindrical portion at the upper and lower end faces of the housing member 5, and the location of this housing member 5 is adjusted by the motors 13A, 13A so that the central axis of the holder 5 substantially coincides with that of the wire electrode 2 extending downwards from the guide roller 11.

The guide die 61, through which the wire electrode 2 is inserted, is attached to the bottom of the guide die holder 6. This guide die holder 6 is elevationally and coaxially inserted in the housing member 5 using the shaft 82, small moving table 86, vibrator 80, resonant horn 81, etc. The guide die holder 6 has at its side face a plurality of working fluid flow holes 6a, so the guide die 61 is sufficiently cooled by the working fluid passing therethrough.

The elongated portion at the end of the resonant horn 81 extends to the inner portion of the housing member 5 through the longitudinally long slit 54 and supports the guide die holder 6, and the opening portion of the vertical slit 54 is sealed by the sealing member 55. For this sealing member 55, it is possible to use a soft rubber sealing packing, an expansible bellows, or a multi-step slide member which is broadly used to protect the slide surface of machine tools, etc.

On the other hand, since the small moving table 86 supporting the vibrator 80 is elevationally supported by the shaft 82, the guide die holder 6 and the guide die 61 can be located at an arbitrary position between the highest position as shown in FIG. 1 and the lowest position as shown in FIG. 2.

The working fluid nozzle 7 is slidably inserted in its axial direction in the opening 52 on the workpiece side of the housing member 5. The working fluid is further supplied therein through the working fluid supplying hose 53 at a prescribed pressure.

In this way as described previously, at least such components as the housing member 5, guide die holder 6, energizing pin 14, guide die 61, working fluid nozzle 7, working fluid supplying hose 53, etc. are also mounted symmetrically or correspondingly below workpiece 3.

The workpiece 3 is attached to the work table 31 and moved in the plane perpendicular to the wire electrode 2 by the motors 32 and 33 which are controlled by a numerical control unit (not shown), and the voltage pulses are fed between the wire electrode 2 and the workpiece 3 from a power supply circuit not shown, thereby performing the spark erosion.

During the working operation, the vibrator 80 is excited to generate supersonic vibration, this vibration being transmitted to the wire electrode 2 through the resonant horn 81, guide die holder 6 and the guide die 61. The vibration of wire electrode 2 serves to provide the smooth supplying of the working fluid into a so-called working gap 3A between the wire electrode 2 and the surface of the workpiece 3 which is being worked and to prevent the occurrence of concentrated discharge.

However, both the above-described guide die holder 6 and the guide die 61 are not necessarily mounted for free up and down movement; but it is possible to fix either of them, for instance, to fix the upper guide die 61 to the guide die holder 6 or in the working fluid nozzle 7, or the like.

Figure 3:
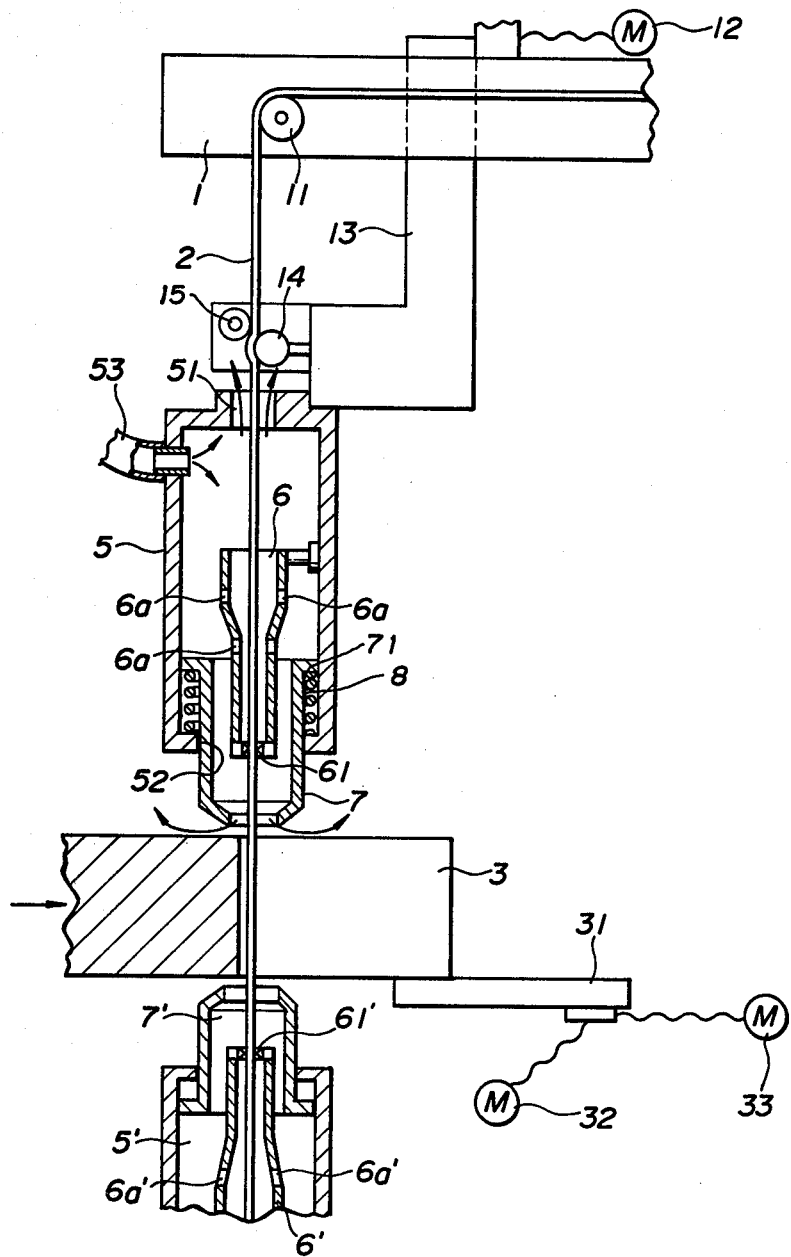
FIG. 3 is a cross section showing an embodiment of the apparatus of the present invention, in which the location of the guide die is fixed in the housing member.

FIG. 3 illustrates an embodiment to fix the guide die holder 6 to the housing member 5 in such a case as stated above.

In the embodiment as shown in FIG. 3, the vibrator 80, resonant horn 81, shaft 82, motors 84 and 85, small moving table 86, etc. which are illustrated in the embodiment shown in FIG. 1 are omitted; the guide die holder 6 is fixed in the housing member 5 and the small moving table 4 and the motor 13A are omitted, and the energizing pin 14 and pinch roller 15 are directly attached to the supporting member 13, the working fluid nozzles 7 and 7' are tapered, and also, a spring 8 is used. Other parts, elements and components as those shown in FIG. 3 are designated by the same reference numerals as in FIGS. 1 and 2, and will not described any further for the purpose of simplicity.

In this case, it is recommended that the guide die 61 be positioned near the opening 52 in which the working fluid nozzle 7 is fitted and outward of the housing member 5.

It is needless to say that both upper and lower guide die holders 6 and 6' and the guide dies 61 and 61' can be fixed for a workpiece 3 having constant thickness.

According to the invention, the working fluid nozzle 7 is urged towards the workpiece 3 by the pressure of the working fluid applied to its flange 71 against the elastic power of the spring 8, so that the edge of nozzle 7 approaches or is in contact with the surface of the workpiece 3, thus efficiently supplying the working fluid to the portion to be cut by the wire electrode 2.

Although the proper setting of the working fluid pressure causes a part of the working fluid to gush outward from the gap between the surface of the workpiece 3 and the edge of the working fluid nozzle 7, most of the working fluid will spout in the slit being cut by the wire electrode 2. The working fluid pressure thus adjusted suitably enables sufficient supply of the working fluid at a constant pressure to the upper and lower openings of the working gap 3A. The flow of the working fluid in the working gap 3A prevents the surrounding air from being swallowed into the gap 3A. The gases produced in the discharge working operation will be immediately absorbed or washed away. Consequently, the spark erosion is smoothly performed without any interruption.

In the case where the workpiece 3 has a thickness less than a predetermined value, it is sufficient to use either the upper or lower working fluid nozzle to work the workpiece 3; however, it is recommended to use a lower working fluid nozzle for the workpiece 3 which is thicker than a prescribed thickness.

It is necessary to use both upper and lower working fluid nozzles for a thicker workpiece 3. For better working performance, in such a case, it is desirable to set the working fluid pressure to be fed to the lower working fluid nozzle at a higher value than that of the upper nozzle.

Figure 4:
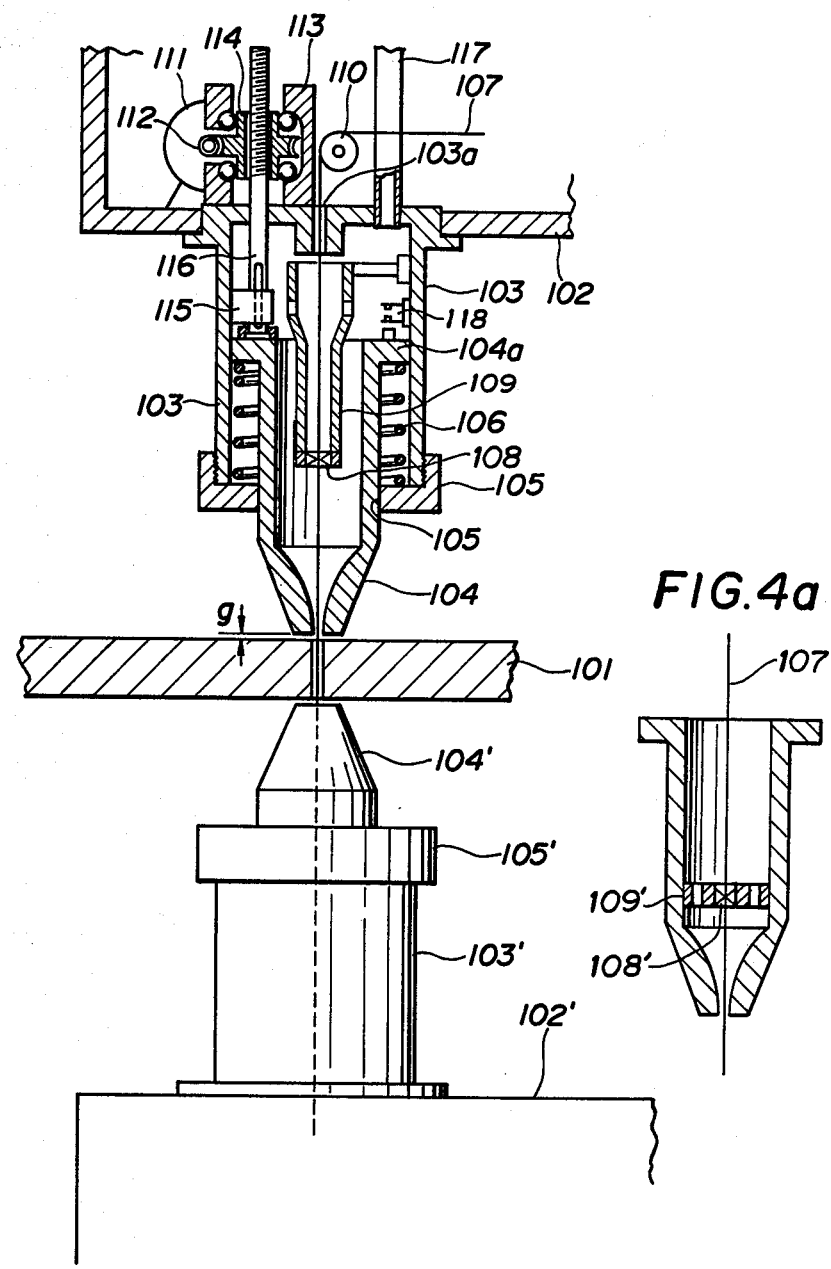

In addition, for a very thick workpiece 3, it is necessary to supply the working fluid alternately to the upper and lower working fluid nozzles or to periodically pulsate the working fluid pressure to be applied; in this case, such an apparatus as shown in FIG. 4 and the subsequent figures which will be explained hereinlater may be used.

Secondly, the apparatus of the invention further provides the opening 51 on the support member side of the housing member 5 which is formed as a cooling fluid jet nozzle for the energizing pin 14 and pinch roller 15, so a part of the working fluid gushes therefrom to cool the energizing pin 14 and pinch roller 15.

Since the energizing pin 14 which will abut against the wire electrode 2 for feeding electricity thereto will generate a large quantity of heat and become high in temperature, it must be cooled appropriately; however, according to the present invention, the effective cooling can be performed without providing any particular cooling apparatus.

Thirdly, according to the present invention, since the guide die 61 is disposed in the working fluid flow and adjacent to the workpiece 3, the guide die 61 itself and the wire electrode 2 guided thereto are also sufficiently cooled. Thus, breaking of the wire electrode 2 and drop of tensile strength are prevented and the spark erosion is smoothly performed, whereby the working accuracy remains at a high level.

Fourthly, in the apparatus of the invention, the guide die 61 is supported so as to freely elevate, so that it is possible to position it to the proper location near the workpiece 3 for better spark erosion.

It is necessary to appropriately select the location of this guide die 61, especially the distance between the die 61 and the lower guide die in accordance with such working conditions as the thickness of the workpiece 3, the ultrasonic vibration to be applied to the wire electrode 2, or the like.

The embodiment shown in FIG. 4 and subsequent figures will be explained hereinafter.

The apparatus shown in FIG. 4 does not automatically balance the working fluid nozzle by the working fluid pressure, but it serves to control the location of the working fluid nozzle and to suitably control the gap g between the edge of the working fluid nozzle and the surface of the workpiece for further assuring the safety in spark erosion, thereby to improve the work efficiency for a particularly thick workpiece. In the construction of this embodiment, the position of the working fluid nozzles 104 and 104' can be controlled. Therefore, even when the workpiece 101 has partially different thicknesses, the spark erosion can be continuously performed while keeping a desired working fluid jet into the working gap without any interruptions because the above-stated positions can be controlled in accordance with a program by memorizing preliminarily such variety of thicknesses of the workpiece.

As described previously, upon working a workpiece having an extreme thickness, a larger working current is reqired. Thus, rapid processing steps will be required when abnormal or concentrated electric discharge occurs or when large current flows through the wire electrode. Therefore, it is necessary to provide extra power for spark erosion and control of the working speed, and to control the working gap by changing the quantity of the fluid which flows therein. In addition, it is necessary that the working fluid be supplied alternately from the upper and lower working fluid nozzles, or that the amount of the working fluid supplied from both working fluid nozzles is pulsated with a proper phase difference; however, in such a case, the aforesaid floating nozzle of the automatic balancing type is not suitable, and it is therefore necessary to control the above-mentioned gap g for obtaining a better working condition. In this embodiment, the good working state and the adverse working state are discriminated for this purpose, and when the working state becomes worse, the location of the working fluid nozzle is controlled to change the gap g for recovering a better working state.

In FIG. 4, reference numeral 101 shows the workpiece; 102 and 102' are upper and lower support members; 103 and 103' housing members; 104 and 104' working fluid nozzles; 105 and 105' cover members; 106 is a spring; 107 a wire electrode; 108 a guide die; 109 a guide die holder; 110 an energizing roller; 111 a motor; 112 a worm gear; 113 a bearing; 114 a worm wheel; 115 a rotation stopping member; 116 a rod; 117 a working fluid supplying tube; and 118 a limit switch which is closed when the working fluid nozzle 104 reaches its highest position in the housing member 103.

In FIG. 4a, an embodiment where the guide die 108' is attached in the working nozzle 104', while in FIG. 4, guide die 108 is fixed in the housing member 103.

An external thread is formed on the upper portion of the rod 116, which is engaged with an internal thread formed in the central portion of the worm wheel 114. The bottom portion of the rod 116 is further connected to the upper portion of the working fluid nozzle 104. A key groove for preventing rotation is also formed in the portion of rod 116 adjacent to the bottom connecting portion and a key engaged in the key groove is further provided on rotation preventing member 115. Therefore, although the nozzle 104 cannot rotate due to the rotation preventing member 115 on the inner surface of the housing member 103, it is supported for free elevation.

When the motor 111 rotates and the worm gear 112 and the worm wheel 114 are accordingly rotated, the rod 116 starts ascending or descending depending upon the rotating direction of the worm wheel 114 to pull-up or push-down the working fluid nozzle 104, thereby controlling the gap g.

Figure 5:
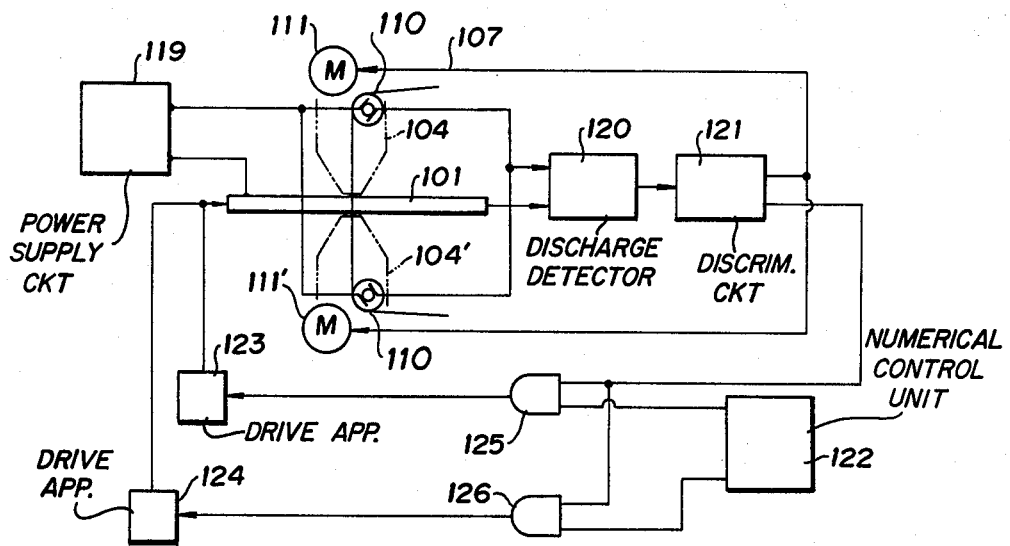
FIG. 5 is a circuit diagram showing the construction of the control unit for controlling the apparatus shown in FIG. 4.

FIG. 5 shows a control unit for controlling motor 111, in which reference numeral 119 indicates a power supply circuit for spark erosion for supplying the voltage pulses between the wire electrode 107 and the workpiece 101, 120 denotes a discharge state detecting apparatus, 121 is a discriminating circuit for discriminating the discharge state whether it is proper or improper, 122 is a numerical control unit, 123 and 124 are drive apparatuses for moving the workpiece 101 in the X- and Y-axis directions by being operated by a command signal given from the numerical control unit 122, and numerals 125 and 126 are AND gates.

Figure 6:
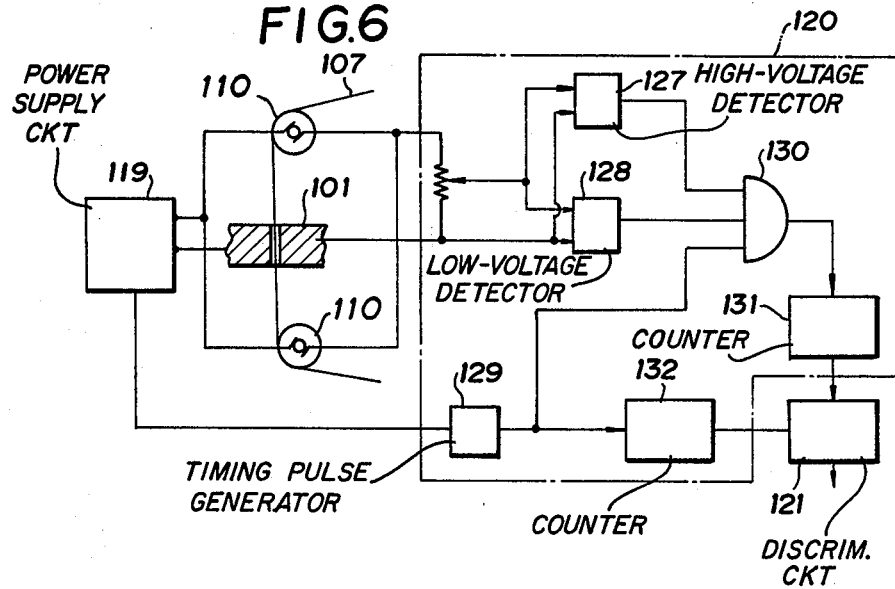
FIG. 6 is a circuit diagram showing the construction of the discriminating circuit for discriminating the electrical discharging state which is used in the circuit shown in FIG. 5.

FIG. 6 is a circuit diagram showing an example of the discharge state detecting apparatus 120. In this example, the discharge state is discriminated in such a manner that the discharge pulses are determined to be proper when the discharge voltage of one pulse is within a proper range of voltage, for instance, when the discharge voltage is within the range of 22 to 70 V when the power voltage is 100 V, and that the ratio of the proper discharge pulses to the number of all voltage pulses applied is obtained, or that the number of occurrences of the proper discharge pulses per unit time is counted.

Returning now to FIG. 6, reference numeral 127 shows a high-voltage detector which produces a logical 0 output when the discharge voltage exceeds the above-mentioned upper limit voltage (70 V) and a logical 1 output when it is less than that. Reference numeral 128 denotes a low-voltage detector which produces a logical 1 output when the discharge voltage is higher than the above-stated lower limit voltage (22 V) and a logical 0 output when it is less than that. Numeral 129 indicates a timing pulse generator for generating a timing pulse after a constant time has elapsed from the rising part of the voltage pulse to be applied from the power supply circuit 119 for spark erosion, more concretely, in the case where the discharge has occurred normally between the wire electrode 107 and the workpiece 101, when the voltage should drop to a value within the above-mentioned proper voltage range due to that discharge. Numeral 130 is an AND gate for circuits 127, 128 and 129. Numeral 131 shows a counter for counting the output for counting the timing pulses from the timing pulse generator 129.

The discriminating circuit 121 serves to obtain the ratio between the count values of the counters 131 and 132 each time the counter 132 counts a constant number of timing pulses and to determine whether it is a constant value or, for example 0.5 or more, or to determine the discharge state to be proper when the ratio is within the predetermined range, for example, from 0.5 to 0.8; otherwise, to determine that the discharge state is defective.

In such a way as explained above, if the discharge state is determined to be proper by the discharge state detecting apparatus 120, a command pulse from the numerical control unit 122 passes through the AND gates 125 and 126 to make the X-axis-directional and Y-axis-directional drive apparatuses 123 and 124 operative, then to move the workpiece 101 along a prescribed passageway, thereby to advance the spark erosion.

On the other hand, in case of an improper discharge state, closing of the AND gates 125 and 126 stops the discharge working temporarily; instead of this, the motors 111 and 111' are driven to realize a better discharge state and the working fluid nozzles 104 and 104' displaced towards or away from the workpiece 101, thereby adjusting the gap g, and thereafter the spark erosion is restarted.

The value of the gap g suitable for operation is determined in accordance with many factors.

Generally, for a workpiece having a relatively thin thickness, an automatic balancing type floating nozzle as described before is used and by controlling the working fluid pressure so that a working fluid jet of an appropriate quantity is discharged between the edge of the working fluid nozzle and the surface of the workpiece, better performance can be obtained; however, even in such a case, it is necessary to suitably set this gap g for the best result.

As the thickness of a workpiece increases, the selection of the value of this gap g becomes further essential and will more significantly influence the working performance.

Figure 7:
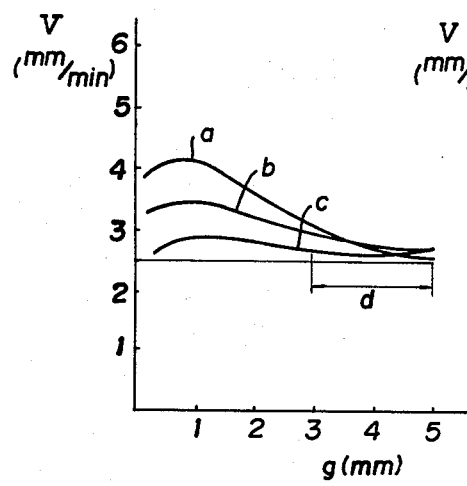
FIG. 7 is a graph showing the relationship between the gap between the workpiece and the point of the working fluid nozzle and the working speed.

FIG. 7 shows the relationship between the above gap g and the working speed V (i.e., the speed at which the work or wire electrode is moved) for working a steel plate S55C having a thickness of 20 mm. In this graph, curves a, b and c respectively indicate the relations between the above gap g and the working speed V when the pressures of the working fluid are 2.1, 1.5 and 1.2 kg/cm². The range indicated by reference character d in FIG. 7 designates a value of the gap which has been adopted in a well-known conventional fixed-type working fluid nozzle.

The working speed changes depending upon the magnitude of the gap g because the frequency of occurrences of the normal discharge pulses changes depending upon the value of the gap g.

It will be understood from FIG. 7 that the work-feeding speed can be improved by setting the gap g to a value which is smaller than value d which has been conventionally used.

The gap g at which the work-feeding speed is maximized at any fluid pressures is also shown in FIG. 7.

Figure 8:
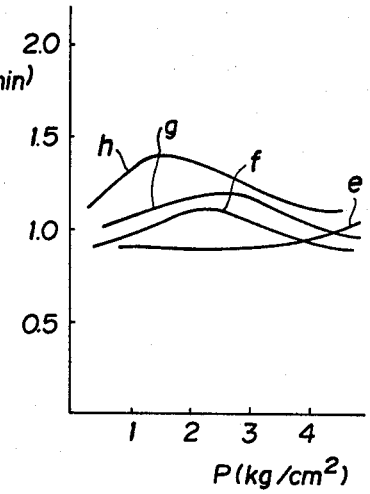
FIG. 8 is a graph showing the relationship between the pressure for supplying the working fluid to the working fluid nozzle and the working speed.

Referring to FIG. 8, there is shown a graph indicating the relationship between the working fluid pressure P and the feeding speed V when the gap g is constant. In this case, a steel plate S55c having a thickness of 60 mm is worked by setting the gap g between the workpiece 101 and the working fluid nozzle 104 to 3 mm.

The relationships between the working fluid pressure P kg/cm² and the working speed V mm/min are shown by the curves e, f, g and h in FIG. 8. Namely, curve e shows the relation in the case where the working fluids are supplied at an equal pressure from both upper and lower working fluid nozzles 104 and 104' of the workpiece 101; curve f in the case of supplying the fluid from either of them; curve g in the case of feeding the fluids alternately for one second at an equal pressure from both of them, and curve h in the case of feeding the fluids using both working fluid nozzles 104 and 104' and adjusting the working fluid pressure in the upper nozzle 104 to 60 to 70% of the working fluid pressure in the lower nozzle 104'.

It will be understood from FIG. 8 that the supplying method as well as the working fluid pressure is also a significant factor, and that the suitable selection of the working fluid pressure in any case results in better performance than the case where this selection is not done.

The combination of the proper gap g and the working fluid pressure P will substantially vary depending upon the material and thickness of the workpiece, the material and diameter of the wire electrode, the waveform of the pulses for spark erosion, the property and temperature of the working fluid, the curvature of contours to be worked, the purpose for spark erosion, etc.

Therefore, before working, the gap g and the working fluid pressure P are preliminarily set into proper numerical values besides the waveform of pulses for spark erosion on the basis of experience. However, unless the desired performance is obtained in those conditions, the afore-mentioned discharge state detecting apparatus 120 and an discriminating circuit 121 indicate the adverse discharge state, so in such a case, the gap g and/or the working fluid pressure P should be readjusted in order to obtain the desirable working speed.

The gap g is readjusted by driving the motors 111 and 111' shown in FIG. 4 to approach the working fluid nozzles 104 and 104' near the workpiece 101 or to retreat therefrom as described previously, then the test working is performed to check the performance. The best gap g is determined on the basis of the test data obtained with respect to various values of the gap g, whereby the working fluid nozzles 104 and 104' are moved by driving the motors 111 and 111' to set the best gap g.

Figure 9:
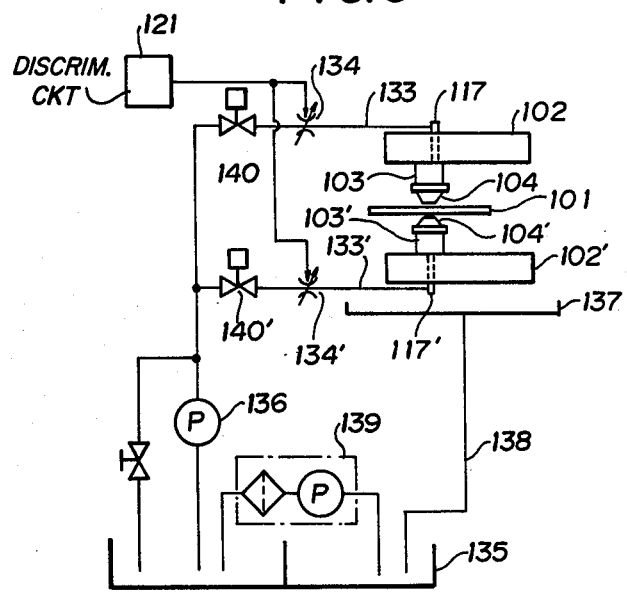
FIG. 9 is a schematic view for describing an example of the means for controlling the pressure of the working fluid which is added to the apparatus shown in FIGS. 4 to 6.

In this case, it is possible to adjust the working fluid pressure P along with the above-explained gap g by connecting a working fluid pressure control unit as shown in FIG. 9 to the electrical discharge machine.

That is, FIG. 9 shows a schematic drawing for describing an example of means for controlling the working fluid pressure which will be added to the apparatus shown in FIGS. 4 to 6.

In the drawing, reference numerals 133 and 133' indicate working fluid ducts 117 and 117' for supplying the working fluids to the working fluid nozzles 104 and 104', respectively; 134 and 134' denote throttle valves; 135 is a working fluid tank; 136 a working fluid pump; 137 a working fluid saucer; 138 a working fluid return pipe arrangement; 139 a working fluid processor; 140 and 140' are electromagnetic control valves.

Although the throttle valves 134 and 134' may be operated manually, they may be controlled in accordance with the output of the discriminating circuit 121.

The electromagnetic control valves 140 and 140' are controlled by a control unit and are properly opened or closed depending upon whether the working fluid is supplied simultaneously from both valves or only from either of them, or the fluid is fed alternately from them.

When the workpiece is the steel plate S55C, the spark erosion can be affected by supplying the working fluid from one of the two nozzles for a workpiece having a thickness of 20 mm or less; however, it is recommended to supply the working fluid from both upper and lower nozzles for a workpiece having a thickness from 20 to 60 mm; furthermore, it is necessary to alternately supply it from the upper and lower nozzles or to supply the higher pressure of fluid in the lower nozzle than in the upper one for a workpiece having a thickness of more than 60 mm. Therefore, the electromagnetic control valves 140 and 140' should be controlled corresponding to these conditions.

Wire-cut electrical discharge machines have, in general, the availability of performing the spark erosion for any workpieces having a thickness in the broad range of from 0.1 mm at most to more than 500 mm, besides various and different materials; moveover, there are a number of requests and limitations for the surface roughness and accuracy of the workpiece.

The gap g is changed step by step by controlling the aforementioned motors 111 and 111', and the open angles of the throttle valves 134 and 134' are also changed in steps to obtain the optimum condition. Otherwise, on the contrary, the open angles of the throttle valves 134 and 134' are changed step by step and then the gap g is changed by controlling the motors 111 and 111' in steps to obtain the best condition.

At this time, it may be possible to perform the above adjustment changing, simultaneously, of the locations or the working fluid pressures of both upper and lower nozzles. Or else, such an adjustment may be also carried out first by using only one of the two nozzles and then the other nozzle.

In the case where both upper and lower nozzles are used for a workpiece having a medium thickness, it is not always necessary to adjust the locations and/or working fluid pressures of both nozzles, but for example, the above adjustment is made by using only the lower nozzle; after that, the upper nozzle may be appropriately operated, as necessary, on the analogy of the resulting data or the like concerning the lower nozzle.

Generally, the working performance, especially the working speed can be improved by setting as follows: the working fluid pressure of the upper nozzle to 1 kg/cm$^2$ or less, e.g. within the range of 0.2 to 0.4 kg/cm$^2$; the working fluid pressure of the lower nozzle to 1 to 2 kg/cm$^2$, e.g. within the range of 1.2 to 1.5 kg/cm$^2$; and the working fluid flow from the lower nozzle to a value larger than the upper one.

Next, another embodiment of the present invention will be described with reference to FIG. 10.

In this embodiment, the state of the working fluid nozzle is changed at any time between the automatic balancing state and the state in which the nozzle can be controlled to a prescribed location.

Figure 10:
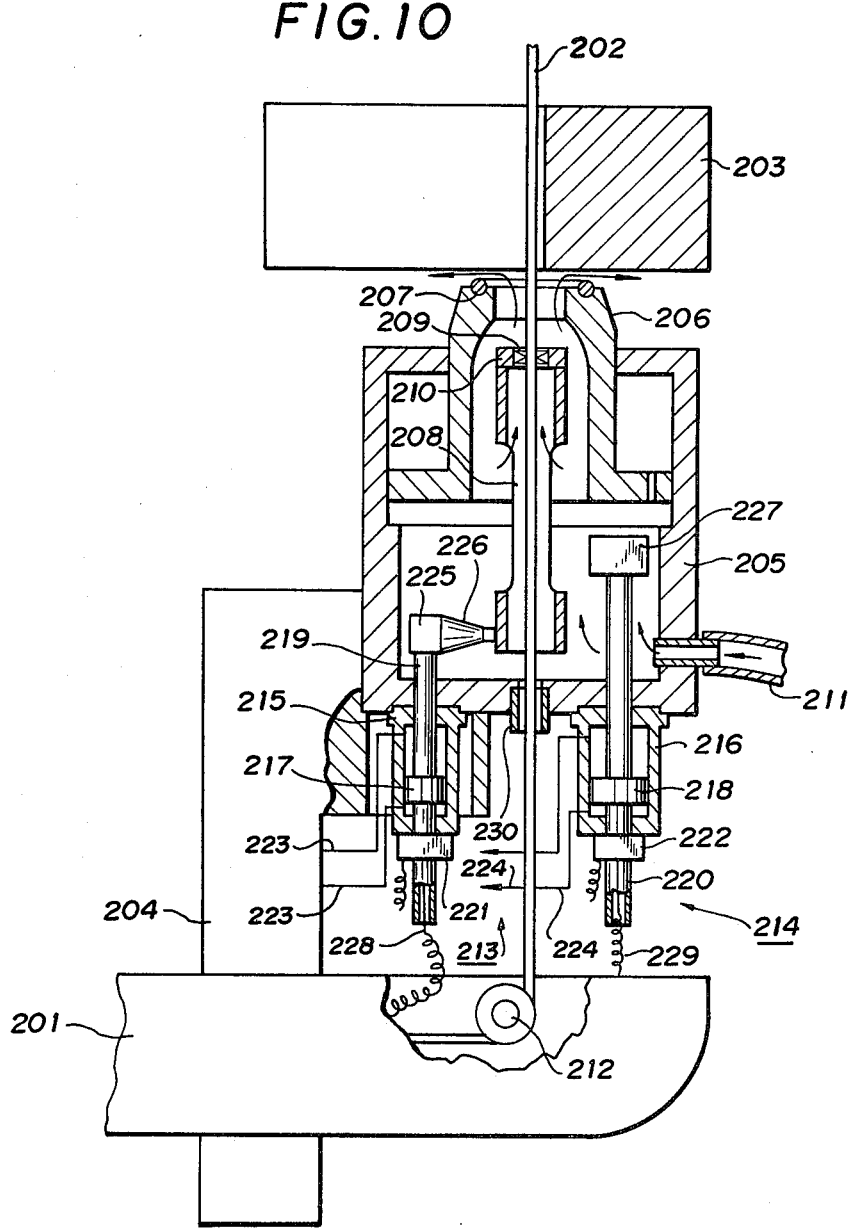
FIG. 10 is a cross section showing another embodiment of the present invention.

In FIG. 10, reference numeral 201 shows an upper support member; 202 is a wire electrode; 203 a workpiece; 204 a supporting member supported elevationally by the support member 201; 205 a housing member; 206 a working fluid nozzle; 207 a sealing member consisting of a soft material; 208 a guide die holder; 209 a guide die of diamond; 210 a casing of the guide die 209; 211 a working fluid hose; 212 an energizing roller; 213 and 214 are respectively hydraulic cylinder units comprising cylinders 215 and 216, pistons 217 and 218, hollow tubular rods 219 and 220, encoders 221 and 222, and hydraulic tubes 223 and 224; 225 a magnetostrictive or electrostrictive vibrator; 226 a resonant horn; 227 a magnetic chuck unit; 228 and 229 are electric wires for supplying the necessary electric power to the vibrator 225 and the magnetic chuck unit 227, respectively; 230 a cooling water supplying nozzle for the energizing roller 212.

In the state as shown in FIG. 10, the magnetic chuck unit 227 is in the rest state and the working fluid nozzle 206 is not mechanically restricted. As in the similar state as shown in FIG. 1, the working fluid pressure and gravity are balanced, and a part of the working fluid flows through the gap between the upper surface of the workpiece 203 and the sealing member 207 formed at the edge of the nozzle 206, and the residual working fluid flows into the slit caused by the cutting machining.

In this embodiment, the location of the guide die holder 208 is controlled and positioned by the hydraulic cylinder unit 213.

The necessary electric power is supplied to the vibrator 225 through the central hole of the hollow tubular rod 219 of the hydraulic cylinder unit 213 by way of the electric wire 228 to generate the ultrasonic vibration, which results in the vibration of the wire electrode 202 through the resonant horn 226, guide die holder 209 and guide die 209.

In the case where the working fluid nozzle 206 is mechanically restricted and used in the manner as shown in FIG. 4, the magnetic chuck unit 227 is displaced upwardly in FIG. 10 by using the hydraulic cylinder unit 214 to abut against the flange portion of the working fluid nozzle 206; at the same time, the magnetic chuck unit 227 is excited by energizing the electric wire 229 which extends through the central hole of the hollow tubular rod 220 to the magnetic chuck unit 227 in order to vibrate the working fluid nozzle 206, and furthermore, by operating the hydraulic cylinder unit 214, the location of the working fluid nozzle 206 is adjusted.

At this time, the locations of the working fluid nozzle 206 and the guide die 209 are respectively coded by the encoders 222 and 221, the signals are then sent to a control unit and a display device both not shown.

In this apparatus as well, a part of the working fluid gushes out from the nozzle 230 to cool the energizing roller 212, and another part thereof flows into the inner portion of the guide die holder 208 through the elongated thin slit formed in the side surface of the guide die holder 208 to cool the guide die 209.

In this embodiment, the soft material sealing member 207 prevents the damage which might be caused when the edge of the working fluid nozzle 206 contacts the workpiece 203 directly, or in some cases, since the sealing member 207 is pushed against the surface of the workpiece 203, the entire quantity of the supplied working fluid is fed into the above-mentioned slit.

Although preferred embodiments of the invention have been specifically illustrated and described herein, it will be appreciated that many modifications and variations of the present invention are possible in light of the above teachings and within the purview of the appended claims without departing from the spirit and intended scope of the invention, particularly with respect to the shapes and structures of, for example the housing member, working fluid nozzle, guide die, and the apparatuses for supporting, restricting and moving them, and the working fluid supplying tube, the guiding and energizing means of the wire electrode, and other components.

What is claimed is:

1. An apparatus for supplying a working fluid and a wire electrode to a work region of a wire-cut electrical discharge machine, comprising:
    a support member,
    a housing member supported by said support member, said housing member having opposed first and second openings,
    means for passing a wire electrode through said housing member via said openings into operative association with a workpiece to be operated on by said electrode,
    means for supplying a working fluid under pressure into the housing member,
    first nozzle means slidably supported by said housing member and projecting towards the workpiece to form an operative gap therewith, said first nozzle means being mounted to discharge working fluid against said workpiece at said gap along and coaxially with said wire electrode which travels therethrough,
    guide die means in said housing member for guiding said wire electrode through said housing member and said first nozzle means while also conveying working fluid therethrough,
    means located outside said housing member for supplying electrical energy to said wire electrode before it enters said housing member,
    and second nozzle means supported by said housing member for discharging working fluid against said means for supplying electrical energy to cool the same.

2. Apparatus as claimed in claim 1 wherein said nozzle means is slidably supported by said housing member and occupies a working position in response to the pressure of said working field and gravity.

3. Apparatus as claimed in claim 2 further comprising a spring means acting on said nozzle means for urging the nozzle means to a displaced position relative to said housing member.

4. Apparatus as claimed in claim 3 wherein said spring means acts on said nozzle means in opposition to the pressure of said working fluid.

5. Apparatus as claimed in claim 1 comprising means supporting said housing member for travel longitudinally of the wire electrode.

6. Apparatus as claimed in claim 1 comprising a soft, sealing member, said first nozzle means having an end facing said workpiece, said soft, sealing member being on said end of said first nozzle means.

7. Apparatus as claimed in claim 1 comprising means supporting said guide die means in said housing member for free displacement longitudinally of said wire electrode.

8. Apparatus as claimed in claim 1 wherein the size of said gap is less than 5 mm.

9. Apparatus as claimed in claim 1 comprising means for moving said guide die means in said housing member longitudinally of the wire electrode.

10. Apparatus as claimed in claim 9 comprising ultrasonic vibrator means connected to and supporting said guide die means for imparting ultrasonic vibrations thereto.

11. Apparatus as claimed in claim 1 comprising means for moving said first nozzle means longitudinally of said wire electrode, and means for detecting the position of said first nozzle means whereby the size of said operative gap can be determined.

12. Apparatus as claimed in claim 11 wherein said means for moving said first nozzle means comprises a displaceable means for engaging said first nozzle means to move the same and hold said first nozzle means in a determined position.

13. Apparatus as claimed in claim 12 wherein said displaceable means has a retracted position in which it is out of contact with said first nozzle means.

14. Apparatus as claimed in claim 13 wherein said first nozzle means is freely slidable in said housing member along the axis of the wire electrode, and with said displaceable means in said retracted position, said first nozzle means occupies a working position under the action of the pressure of said working fluid and gravity.

15. Apparatus as claimed in claim 14 comprising a soft, sealing member, said first nozzle means having an end facing said workpiece, said soft, sealing member being on said end of said first nozzle means.

16. Apparatus as claimed in claim 14 comprising means for moving said guide die means in said housing member longitudinally of the wire electrode.

17. Apparatus as claimed in claim 14 comprising ultrasonic vibrator means connected to and supporting said guide die means for imparting ultrasonic vibrations thereto.

18. An apparatus for supplying a working fluid and a wire electrode to a work region of a wire-cut electrical discharge machine, comprising:
    a support member,
    a housing member supported by said support member, said housing member having opposed first and second openings,
    means for passing a wire electrode through said housing member via said openings into operative association with a workpiece to be operated on by said electrode,
    means for supplying a working fluid under pressure into the housing member,
    nozzle means slidably supported by said housing member and projecting towards the workpiece to form an operative gap therewith, said nozzle means being mounted to discharge working fluid against said workpiece at said gap along and coaxially with said wire electrode which travels therethrough,
    guide die means in said housing member for guiding said wire electrode through said housing member and nozzle means while also conveying working fluid therethrough,
    means for moving said guide die means in said housing member longitudinally of the wire electrode, and means located outside said housing member for supplying electrical energy to said wire electrode before it enters said housing member.

19. Apparatus as claimed in claim 18 comprising ultrasonic vibrator means connected to and supporting said guide die means for imparting ultrasonic vibrations thereto.

20. An apparatus for supplying a working fluid and a wire electrode to a work region of a wire-cut electrical discharge machine, comprising:
   a support member,
   a housing member supported by said support member, said housing member having opposed first and second openings,
   means for passing a wire electrode through said housing member via said openings into operative association with a workpiece to be operated on by said electrode,
   means for supplying a working fluid under pressure into the housing member,
   nozzle means slidably supported by said housing member and projecting towards the workpiece to form an operative gap therewith, said nozzle means being mounted to discharge working fluid against said workpiece at said gap along and coaxially with said wire electrode which travels therethrough,
   guide die means in said housing member for guiding said wire electrode through said housing member and nozzle means while also conveying working fluid therethrough,
   means for moving said nozzle means longitudinally of said wire electrode,
   means for detecting the position of said nozzle means whereby the size of said operative gap can be determined, and
   means located outside said housing member for supplying electrical energy to said wire electrode before it enters said housing member.

21. Apparatus as claimed in claim 20 wherein said means for moving said nozzle means comprises a displaceable means for engaging said nozzle means to move the same and hold said nozzle means in a determined position.

22. Apparatus as claimed in claim 21 wherein said displaceable means has a retracted position in which it is out of contact with said nozzle means.

23. Apparatus as claimed in claim 22 wherein said nozzle means is freely slidable in said housing member along the axis of the wire electrode, and with said displaceable means in said retracted position, said nozzle means occupies a working position under the action of the pressure of said working fluid and gravity.

24. Apparatus as claimed in claim 23 comprising a soft, sealing member, said nozzle means having an end facing said workpiece, said soft, sealing member being on said end of said nozzle means.

25. Apparatus as claimed in claim 23 comprising means for moving said guide die means in said housing member longitudinally of the wire electrode.

26. Apparatus as claimed in claim 23 comprising ultrasonic vibrator means connected to and supporting said guide die means for imparting ultrasonic vibrations thereto.

* * * * *